United States Patent [19]

MacAskill

[11] 3,995,987
[45] Dec. 7, 1976

[54] HEAT TREATMENT OF PARTICULATE MATERIALS

[76] Inventor: Donald MacAskill, 102 Overhill Road, Orinda, Calif. 94563

[22] Filed: Mar. 31, 1975

[21] Appl. No.: 563,863

[52] U.S. Cl. .................................. 432/15; 34/10; 432/58
[51] Int. Cl.² ........................................ F27B 15/00
[58] Field of Search ............. 432/14, 15, 58; 34/10

[56] References Cited
UNITED STATES PATENTS

| | | | |
|---|---|---|---|
| 2,529,366 | 11/1950 | Bauer | 432/15 |
| 2,581,041 | 1/1952 | Ogorzaly et al. | 34/10 |
| 2,670,193 | 2/1954 | Pyzel | 432/15 |
| 3,870,534 | 3/1975 | Van Dornick | 432/15 |

*Primary Examiner*—John J. Camby
*Attorney, Agent, or Firm*—Townsend and Townsend

[57] ABSTRACT

A multiple-stage calcining system employing different conditions in each calcining stage so that quality, capacity and temperature control can be maximized. Advantage is taken of the difference in ignition temperatures of fuels.

7 Claims, 1 Drawing Figure

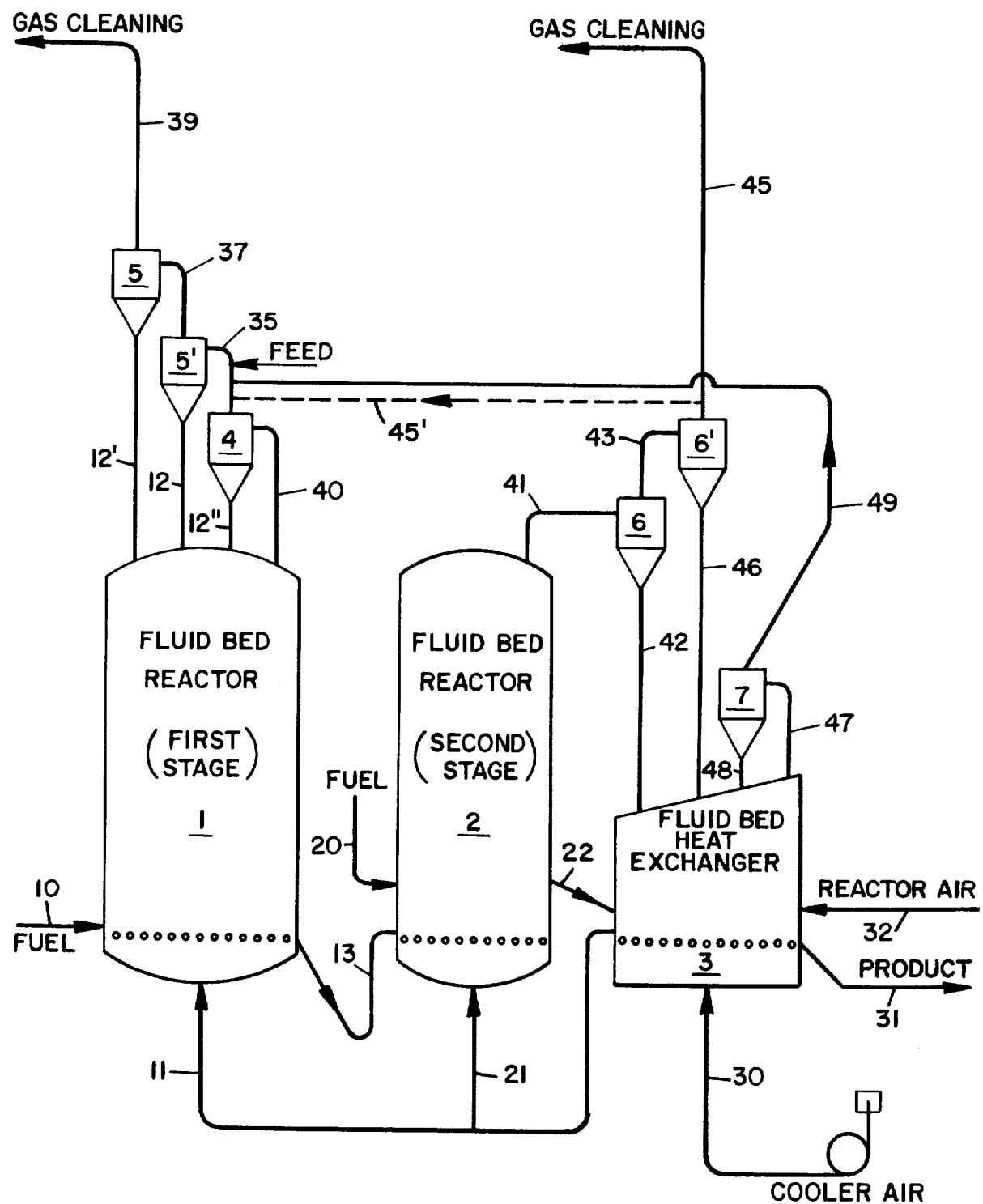

HEAT TREATMENT OF PARTICULATE MATERIALS

BACKGROUND OF THE INVENTION

This invention relates to heat treatment of particulate materials and, more particularly, but not exclusively, to the calcining of ores, precipitates, concentrates and residues. In particular, the invention is applicable to fluid-bed calcination of phosphates, limestone, silicates of aluminum, alkaline earth minerals and sludges, and the like.

Heat treatment at less than melting temperatures, e.g., calcining, of particulate materials in a vertically-oriented fluidized bed, is well known. Such a fluidized bed is formed when a fluidized gas flows upwardly through a bed of suitably sized solid particles at a velocity sufficiently high to buoy the particles, to overcome the influence of gravity thereon, and to impart thereto an appearance of great turbulence. In some instances, the fluidizing gas used to form the fluidized bed can be air. More advantageously, the fluidized gas contains heat-generating components, i.e., fuel, which provides the heat for accomplishing the calcining in the fluidized bed.

The heating of the fluidized bed can be achieved either by using hot combustion gases as the fluidizing gas, or by actually burning a fuel within the fluidized bed itself. Among the known advantages for the latter method are the elimination of many restrictions on the type of materials that are available for fabrication of the fluidization grid (distribution plate). For example, when the heat generated by burning fuel in the fluidized bed, the grid need not withstand high temperatures. In addition, in-bed combustion of fuel provides a more even temperature distribution within the fluidized bed, thereby accomplishing more uniform heat treatment.

The combination of the fluid bed technology and flash calcining has heretofore been employed when treating alumina to increase equipment capacity. This technology has not previously been adopted to treatment of phosphate rock, limestone and other materials that are so heat sensitive that excessive temperatures (or insufficient residence time) would tend to result in unsatisfactory calcined products. Futhermore, conventional units, utilizing the fluidized bed approach for calcining, accomplish all the heat treatment in one compartment with various other compartments provided merely to assist in the recovery of heat. Because calcination is so strongly endothermic, heat must be supplied both to maintain the reaction temperature and to satisfy the heat requirements of the reaction. As a consequence, conventional systems employ large excesses of air, frequently more than 30% excess, with a resulting loss in thermal efficiency. Still further, such conventional vertical fluid bed systems are usually limited to one type of fuel and the inherent minimum fluid bed temperature resulting therefrom.

SUMMARY OF THE PRESENT INVENTION

The present invention is directed to a fluidized bed calcining system adapted to be operated at high capacities while avoiding uncontrollable high temperatures heretofore inherent in a flash calcining. By eliminating vertical staging, the system of this invention provides the flexibility to adjust the residence time to suit the requirements of the particular material being heat treated.

The present invention resides in a system that utilizes at least two separate fluid bed reactors wherein initial low temperature heating (at about 1100° F) is accomplished in a first stage, while further higher temperature heating as required by the process is accomplished in a second or subsequent stage. As a result of this modification, fuels can be selected for each of the stages consistent with the temperature requirements of that stage. In this manner, the first stage can be heated by a fuel with a low ignition temperature such as coal (capable of creating a fluid bed temperature of about 1100° F), while the second stage can be heated with the fuel of choice, such as gas or oil, or the same fuel as the first stage.

The primary advantage to using a low ignition point fuel in the first stage is that this stage may then be designed and operated at very high capacities, not excluding dispersed phase fluidization. Temperatures in the first stage will not be totally uniform, but have been found to be within desired ranges, averaging about 1100° F. In addition, it has been found that the major part of the calcination work load can be carried out in this first stage, since this work load consists of oxidizing low grade organics of a nature similar to coal or lignite, and removing water of hydration which essentially is removed below 1100° F.

However, since this is a fast, somewhat crude type of combustion, more precise, slightly higher temperature and residence time is required to meet normal product standards of residual organic carbon and loss on ignition. To satisfy these conditions, in the second stage, rates are slowed down to correspond with conventional practice and a dense phase fluidized bed employed for control purposes.

Normally, the high velocities would result in uneven temperature conditions and this is true in this case also. However, by selecting a fuel which will burn at low temperatures, the irregularities will not be of such degree that they would prove deleterious to product quality. For instance, in fluid bed reactors that are experiencing poor combustion, with consequent freeboard burning, the freeboard may be 200° F above the bed temperature.

In the case of phosphate, maximum temperatures from a product control point of view are about 1500° F. With a desired first stage temperature of 1100° F, this allows 400° F of loss of temperature control, and considerably widens the operating band from existing practice.

The multiple-stage system of this invention has the additional advantage that the second (or subsequent) stage heat requirements would be decreased as the material entering such subsequent stages will have been subjected to significant preheating in the prior stage or stages. More particularly, improved thermal efficiency results from minimizing any excess air necessary to accomplish complete combustion.

Furthermore, it is possible to divide the gas streams leaving the two stages, when so desired. These separate streams have different gas analysis, and temperatures, and in certain processes it will be advantageous to handle these separately. An example is the calcination of lime sludges or precipitates, as practiced in the sugar industry. Here it is desired to have a gas stream that is high in $CO_2$. Conventional lime sludge calciners will not deliver a desirable strength of $CO_2$ due to the commingling of combustion gasses with the $CO_2$ derived from the calcium carbonate.

The two stage calcining system herein described produces high grade $CO_2$ gas in the stream from the second stage by virtue of the fact that the sludge has been dried and preheated to just below decomposition temperature in the first stage.

The separation of gas streams can also be very effective in permitting maximum thermal efficiency in the process under consideration. For instance, the first stage can be operated at a split ratio just sufficient to produce a minimum off-gas temperature. The second stage, with high temperature off-gases then permits the most effective use of conventional heat recovery equipment such as waste heat boilers, etc.

As an aside, the elimination of vertical alignment of the fluid bed stages greatly reduces maintenance problems in that the grids supporting the fluidized beds are never subject to the passage therethrough of dust-laden gases.

BRIEF DESCRIPTION OF THE DRAWING

The drawing is a simplified flow diagram illustrating a preferred mode of practicing this invention.

GENERAL DESCRIPTION OF THE PREFERRED EMBODIMENT

Referring to the drawing, the shown embodiment is a system in which the material being processed and fluidizing air (and fuel) move in generally counter-current flow through a series of fluid bed reactors. The essential units of equipment involve a first stage fluid bed reactor 1 and a second stage fluid bed reactor 2. Among the auxilliary units of equipment depicted in the drawing are fluid bed heat exchanger 3 and a plurality of cyclone collectors 4, 5, 5', 6, 6' and 7.

In more particular, fluid bed reactor 1 is provided with a fuel inlet line 10 for dispersing finely divided coal, or other low ignition point fuel, into the fluidized bed portion of fluid bed reactor 1. In addition, reactor 1 is provided with fluidizing gas inlet line 11 preferably entering at the bottom thereof for introducing sufficient gas to maintain the material being treated in a fluidized condition. Raw materials, such as phosphates, to be calcined, enter fluid bed reactor 1 via lines 12, 12' and 12'' at locations above the fluid bed therein. Fluid bed reactor 1 is also provided with product outlet line 13, for transfer of first stage product to second stage fluid bed reactor 2.

Fuel, such as gas or oil, is introduced to reactor 2 through fuel line 20, while fluidizing gas is introduced through gas line 21. Product outlet line 22 is provided for transporting the completely calcined product out of reactor 2 to fluid bed heat exchanger 3. Ambient temperature air or gas for recovering heat from the calcined product enters exchanger 3 via line 30 to provide the fluidizing media for exchanger 3. Additional reactor air can be introduced through line 32. The product is removed from exchanger 3 through product recovery line 31.

Referring now to that portion of the flow diagram relating to dust recycle, cyclone collector 4 is provided to separate gas entrapped fines being removed through line 40 from reactor 1. Fines lost in collector 4 are transferred via line 35 for further separation in cyclone collector 5', while the heavy particles are returned to reactor 1 through the aforementioned line 12''. Here again, the solids are recycled from collector 5' to reactor 1 via line 12 (along with original feed) while fines lost in collector 5' are transferred via line 37 to a further cyclone collector 5. The separation occurring in collector 5' results in the return of additional heavy particles via line 12' to reactor 1 while fines lost from collector 5 are directed via line 39 to gas cleaning equipment (not shown).

Similarly, fines being carried out of reactor 2 via line 41 are directed to cyclone collector 6 for separation, with heavy particles being directed to heat exchanger 3 via line 42 while fines lost are transferred via line 43 for further separation in collector 6'. Fines lost from collector 6' are transferred via line 45 to gas cleaning equipment (not shown) while heavy particles are directed via line 46 to fluid bed heat exchanger 3. Alternatively, fines lost from collector 6' can be directed via line 45' to be combined with original feed entering line 35.

Fines carried from fluid bed heat exchanger 3 pass via line 47 to cyclone collector 7 from whence heavy particles are returned to heat exchanger 3 via line 48 while fines are transferred via line 49 to combine with incoming feed in line 35.

In a further preferred embodiment, the fuel to fluid bed reactor 1 is distributed from above the respective fluidized bed through a single centrally located distributor. Thus, in particular, coal is pneumatically introduced to reactor 1 through a central distributor. Alternatively, fuel may be added to the feed in the correct proportions to maintain desired stoichiometric and thermal conditions.

Details as to relative sized, shapes and placement of the pieces of equipment and provisions for various other conventional equipment components are omitted for clarity since they will be readily supplied by those skilled in the relevant art.

The following specific example of the invention will serve to illustrate more clearly the appliction of the invention, but is not to be construed as in any manner limiting the invention.

TWO-STAGE CALCINATION OF PHOSPHATE 70 tons per hour of washed, dried phosphate rock, in a size range of minus 20 plus 200 U.S. mesh size, and containing 2% organic carbon, 3% entrapped carbon dioxide, 2% water hydration and 93% phosphate and other minerals, by weight, was fed to the first fluidized reactor.

Utilizing coal as makeup fuel in addition to the 2% organic carbon in the feed to the first stage, the temperature was maintained at 1100° F. Makeup coal was required to the extent of 72 pounds per hour.

Employing natural gas, the second stage reactor temperature was controlled at 1450° F. The feed to the second reactor was found to represent 93% of the original feed to the first reactor, losses having involved the water of hydration, various organic carbon, carbon doxide and dust particles carried away in the fluidizing air. The first reactor unit required 4,000 standard cubic feet per minute of air to maintain the fluidized bed. An additional 3,000 standard cubic feet per minute of fluidizing air was required in the second reactor unit.

It was found that further dust losses in the second stage reactor resulted in a yield of 91% of the original weight of the phosphate rock being recovered from the second stage reactor.

While a preferred embodiment of the present invention has been shown and described above, it will be readily apparent to those skilled in the art that various modifications thereof can be made without departing from the spirit and scope of the invention as defined by the appended claims.

What is claimed is:

1. A method for heat treating a material selected from ores, precipitates, concentrates and residues so that hydrates, carbonates and the like are decomposed while volatiles are expelled, comprising:

introducing said material into a first high capacity fluidized stage;

controlling the introduction of oxygen-containing gases to said first stage to create an environment wherein incomplete oxidation will occur while said fluidized material is being heated to about 1100° F;

transferring said partially oxidized material from said first stage to a second fluidized stage;

adding sufficient oxygen to substantially complete combustion of said partially oxidized material by heating to a temperature in excess of 1100° F; and recovering said material from said second stage.

2. A method in accordance with claim 1 wherein said heated material is transferred from said second stage to a fluidized cooling stage wherein air is provided in an amount sufficient to cool said heated material to below about 500° F.

3. A method in accordance with claim 1 wherein the first stage fuel is coal, or other low ignition point fuel.

4. A method in accordance with claim 1 wherein the second stage fuel is selected from natural gas and oil.

5. A method in accordance with claim 1 wherein the air velocities in said first stage are maintained at 3–15 feet/second.

6. A method in accordance with claim 1 wherein the air velocities in said second stage are maintained at 1–5 feet/second.

7. A method in accordance with claim 2 and further characterized by the steps of separating fines from said first, second and cooling stages, passing said fines through respective cyclone separations where heavy particles are recovered and returning said heavy particles to respective of said first and cooling stages.

* * * * *